Patented July 18, 1950

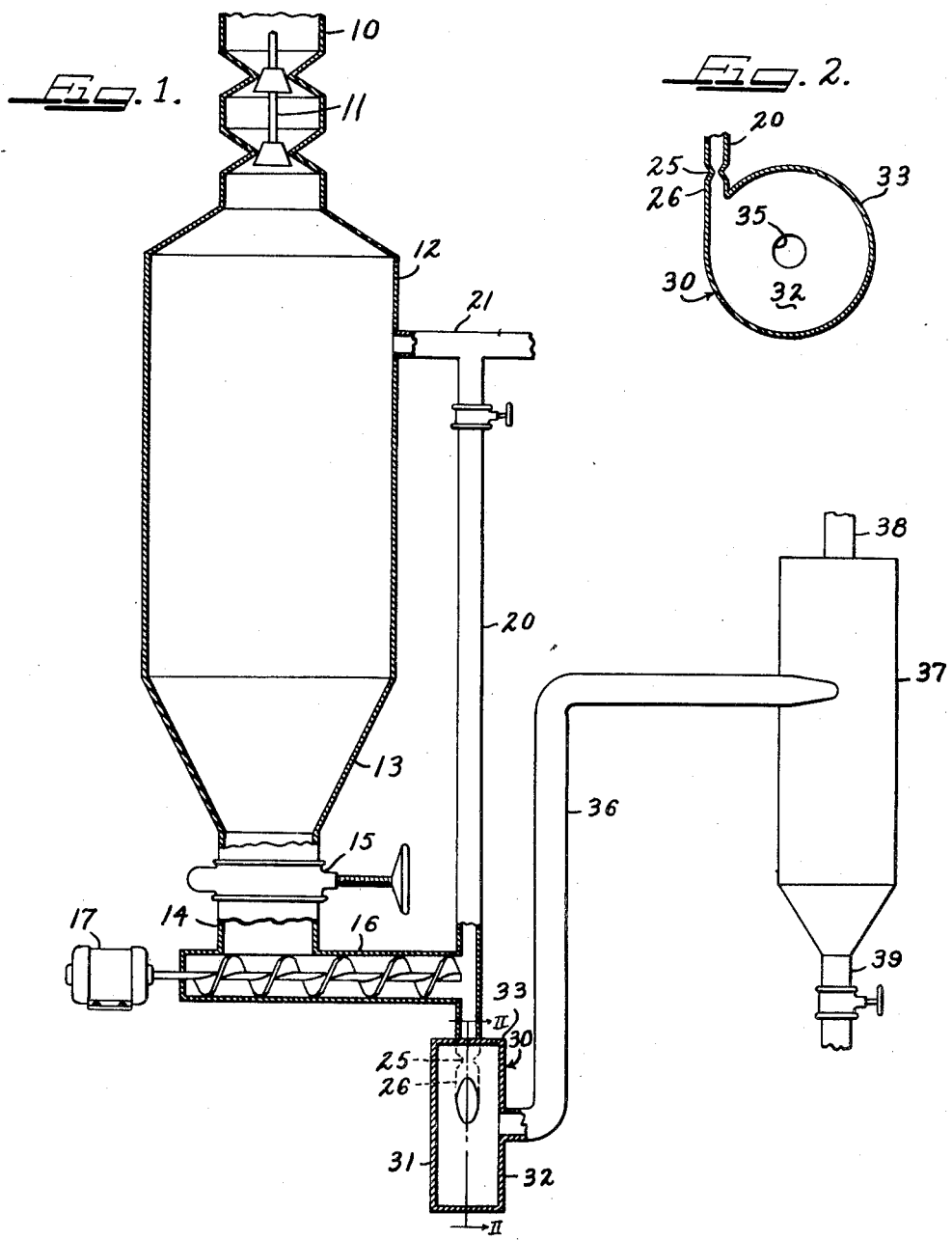

2,515,541

UNITED STATES PATENT OFFICE 2,515,541

APPARATUS FOR DISINTEGRATION OF SOLIDS

John I. Yellott, Baltimore, Md., assignor to Institute of Gas Technology, Chicago, Ill.

Application July 22, 1947, Serial No. 762,589

2 Claims. (Cl. 241—39)

This invention relates to a comminution device in which coarse solids are first shattered explosively so as to form a rapidly flowing gaseous suspension of shattered particles which is caused to perform a vortical movement whereby the kinetic energy of said suspension is utilized for further comminution of the shattered particles. In the preferred form of the apparatus of this invention, coarse solids are first shattered explosively and the resulting rapidly flowing gaseous suspension of shattered particles is subjected to the action of means operative concurrently to separate the relatively finer shattered particles from the relatively less fine shattered particles and to comminute still further the relatively less fine shattered particles, so that the final product of the comminution will be a comminuted material made up of particles of more nearly uniform size.

Applicant has invented a method for flash pulverizing not claimed in this application involving the steps of forming a rapidly moving entrainment of coarse solid particles to be comminuted in a gas under pressure moving through a constricted open-ended tube. As said entrainment rapidly moves through said constriction towards said opening, there is effected a practically instantaneous pressure drop that explosively shatters the entrained coarse particles to form a gaseous entrainment of shattered particles. In such flash pulverizing apparatus, the tube containing the entrainment of the coarse particles to be shattered may be constricted at the open end of the tube or further upstream. In either case, there is a conversion of pressure head into kinetic energy, so that the final gaseous entrainment of comminuted particles moves more rapidly but under lower pressure than the original gaseous entrainment of relatively coarse particles to be comminuted.

The kinetic energy content of the final gaseous entrainment of comminuted or shattered particles is utilized for further comminution in the apparatus of my said copending application. The rapidly moving gaseous entrainment of explosively shattered particles is directed into a generally circular vortex chamber transversely and to one side of the axis of said vortex chamber, and preferably more or less tangentially with respect to the vortex chamber. The rapidly flowing gaseous entrainment then establishes a vortex or whirling flow in said chamber, which is provided with axial central discharge openings. Due to the vortical or whirling movement of the gas, the relatively less fine explosively shattered particles move radially outwardly within the vortex chamber, while the relatively finer particles tend to remain in the central region of the vortex chamber and are discharged through a central axial aperture. The relatively less fine particles thrown radially outwardly within the chamber by centrifugal force are carried around in the outer portion of the chamber and are there further comminuted by impact against the peripheral wall of the chamber and with other particles and by abrasion between said outer walls and other particles. When thus comminuted, disintegrated or worn down to smaller particle size, the resulting smaller particles are discharged through an axial central discharge aperture.

The present application is particularly directed to methods and apparatus which utilize the kinetic energy of the mixture of a fluid and solids issuing from a flash pulverization nozzle to separate the variously sized solid particles and to pulverize additionally the coarser of those particles by impact and/or attrition.

It is therefore an important object of the present invention to provide method and apparatus for the comminution of solids involving an initial flash pulverization followed directly by comminution of the shattered particles in a vortex chamber utilizing the kinetic energy of the gaseous suspension of shattered particles produced by flash pulverization.

A further important object of the present invention is to provide method and apparatus for the comminution of solids involving an initial flash pulverization followed directly by selective comminution of the relatively less fine shattered particles in a vortex chamber.

Another important object of the present invention is to provide apparatus of the type indicated including a flash pulverization device combined with a vortex chamber having a central axial discharge opening in such manner that the gaseous entrainment issuing from said flash pulverizing apparatus will be introduced into said vortex chamber transversely and to one side of the axis of said vortex chamber for the establishment in said chamber of a vortical gas movement involving inward radial movement of relatively fine shattered particles under the entraining action of the streaming gas and radially outward movement of relatively less fine shattered particles under the action of centrifugal force effecting further comminution of said relatively less fine particles by attrition and/or impact followed by entrainment and discharge subsequent to such further comminution.

Other and further objects and features of the present invention will become apparent from the following description and appended claims. The attached drawing shows, diagrammatically and by way of example, an apparatus according to the present invention. More particularly:

Figure 1 is a longitudinal vertical cross sectional view, with parts shown in elevation, of an apparatus according to the present invention; and Figure 2 is a fragmentary vertical cross sectional view taken along the line II—II of Fig. 1.

In Fig. 1, the reference numeral 10 indicates a hopper having a conical bottom for receiving the solid material to be comminuted, such as coarsely fragmented coal. The hopper 10 is provided at its discharge end with a double bell and hopper device or other gas lock means 11 for discharge into a tank 12 having a conical bottom 13 discharging into a conduit 14 provided with a valve 15. The conduit 14 communicates directly with and serves to conduct the coal or other material to be comminuted into a horizontally extending tubularly enclosed screw feeder or conveyor 16 driven by a motor 17. The screw conveyor 16 moves the coal or other solid material to be comminuted into the lower end portion of a vertically extending conduit 20.

Hot steam or air or other gas under pressure is admitted into the upper part of the tank 12 through a conduit 21. The conduit 20 branches off downwardly from the conduit 21.

The lower end portion of the conduit 20, downstream of the discharge opening of the screw conveyor 16, is sharply constricted, as at 25, to form a convergent-divergent nozzle followed by a short conduit 26 of approximately the same diameter as the conduit 20. This conduit communicates directly with a generally circular vortex chamber 30 extending in generally horizontal axial direction. More particularly, the vortex chamber 30 includes spaced, disk-shaped left and right side walls 31 and 32 together with an intermediate annular wall 33. It will be noted that the end of the conduit 26 is attached to the annular wall 33 approximately midway between the side walls 31 and 32 so as to discharge into the chamber 30 transversely and to one side of the axis of the chamber 30. In the form of apparatus shown in Fig. 2, the direction of discharge from the conduit 26 into the vortex chamber 30 is almost, but not quite, tangential.

If desired, the constriction 25 may take the form of a convergent nozzle discharging directly and more or less tangentially into the vortex chamber 30, the conduit 26 then being omitted. When a convergent-divergent nozzle is used, the nozzle may also discharge directly into the vortex chamber 30, the conduit 26 being omitted.

The right hand side wall 32 of the chamber 30 is pierced by a central axial aperture 35 discharging into a conduit 36 leading to a cyclone separator 37 provided with an upwardly extending discharge pipe 38 for gas and a downwardly extending valve discharge conduit 39 for solids.

At the start of the operation of the above described apparatus, coal or other solid material in coarsely fragmented form is charged through the hopper 10 and the gas lock 11 into the tank 12. Steam, air or other gas under pressure is introduced through the conduit 21 into a tank 12 and caused to flow rapidly through the conduit 20. The screw conveyor 16 is operated to advance coal or other solid material to be comminuted into the stream of air, steam or other gas passing rapidly through the conduit 20 in a downward direction. The nozzle 25 is so spaced from the discharge opening of the screw conveyor 16 that the coal or other solid material discharged into the conduit 20 will attain approximately the same speed as the gas flowing through the conduit 20 before reaching the nozzle 25. Expansion occurs continuously as the compressed gas in the pipe 20 passes through the nozzle 25 at critical velocity and causes an explosive shattering of the solid particles by virtue of the expansion of compressed air, steam or other gas contained within the porosities of the solid particles. From the nozzle 25, the expanded gas-comminuted solid mixture passes into the conduit 26.

The operating pressure for the steam or other gas in the conduit 20 should be at least 5 lbs. per sq. in. and may be as high as 750 lbs. per sq. in. when the apparatus is employed for the comminution of coal. If upstream pressures of 5 lbs. per. sq. in. are used, however, the required downstream pressure will be below atmospheric and the degree of comminution is not so great. Superheated steam at a temperature of between 350° and 450° F. or higher is suitably employed. At the preferred operating pressure of about 200 lbs. per sq. in. or higher in the conduit 20, the pressure in the conduit 26 may suitably be about 60 lbs. per sq. in. or less.

It should be understood that the extent of comminution is determined, inter alia, by the pressure level of operation, by the difference between the upstream and the downstream pressures on the two sides of the nozzle 25, by the ratio of gas to solids passing through the nozzle 25, and by the rate of movement of solids through the nozzle 25. Finer comminution is effected by the maintenance of maximum upstream and minimum downstream pressures, by the use of relatively large amounts of gas as compared to the amount of solids, and by the establishment of rapid flow of solids through the nozzle.

The streaming entrainment of comminuted coal or other solid material issues from the conduit 26 into the vortex chamber 30 where the gas forms an inwardly spiraling vortex. The gas being introduced moves at a high rotative speed but a low inward speed in said vortex, so that the relatively less fine particles, under the action of centrifugal force, are kept in the peripheral portions of the vortex chamber 30 where they are further comminuted or disintegrated by impact upon the chamber walls or upon other particles or by attrition. Because of the high rotative rate of movement of the fluid and its relatively low inward rate of movement there is a strong tendency to return to the outer portion of the vortex for further grinding action such relatively less fine particles as may be thrown into, or as otherwise reach the inner portion of the vortex chamber. The relatively finer particles introduced through the conduit 26, as well as the particles of similar fineness resulting from the further grinding of the relatively less fine particles, are entrained by the gas being discharged through the axial aperture 35 and are carried through the conduit 36 to the cyclone separator 37, where the gas and the fine particles may be separately recovered.

The axial extent of the vortex chamber is preferably so limited that the fluid movement in different axial positions in the vortex will be substantially the same.

As shown in Figures 1 and 2 in my copending application, Serial No. 530,177, now abandoned, a vortex chamber 44 may be provided having an upper disk-like closure member, an upper axial discharge conduit 45, a lower conical discharge member and a lower axial discharge conduit 46.

By way of example, I tabulate hereinbelow results obtained using a flash pulverizing device equipped with a vortex chamber according to the present invention. For comparison, results obtained with the same flash pulverizing device in the absence of the vortex chamber are also tabulated. The same material (Illinois coal) was used for both runs. This material was characterized by the following screen analysis:

| U. S. S. Screen Size | Per Cent Retained on U. S. S. Mesh Screens |
|---|---|
| 16 | 21.4 |
| 20 | 12.4 |
| 30 | 8.8 |
| 40 | 12.0 |
| 60 | 12.4 |
| 80 | 7.6 |
| 100 | 3.0 |
| 140 | 6.4 |
| 200 | 4.2 |
| 270 | 3.0 |
| −270 | 8.6 |

This coal can also be characterized as having a "surface factor" of 133.9. The "surface factor" is a measure of the degree of fineness and is determined by multiplying each screen mesh fraction by an appropriate factor specific to each screen size. The table given below shows the factors used for each screen size.

16–30 mesh --------------------- 37.2
30–60 mesh --------------------- 75.2
60–100 mesh -------------------- 137.7
100–200 mesh ------------------- 258.7
Finer than 200 mesh ------------ 500

In determining the surface factor of the product, the percentages of solid between the various limits given above are multiplied by the corresponding factors. The total of individual values so obtained represents the surface factor of the material as a whole.

Using the above identified Illinois coal, the apparatus according to the present invention including a vortex chamber yielded a product characterized by a surface factor of 282 and having the following screen analysis:

| Screen Size | Per Cent Retained |
|---|---|
| 16 | 1.4 |
| 20 | 3.0 |
| 30 | 4.8 |
| 40 | 7.2 |
| 60 | 11.8 |
| 80 | 7.6 |
| 100 | 4.8 |
| 140 | 12.0 |
| 200 | 6.6 |
| 270 | 14.2 |
| −270 | 25.6 |

When the same apparatus was employed to pulverize the same coal, but with omission of the vortex chamber, a product was obtained having a surface factor of 242.6 and characterized by the following screen analysis:

Mesh screen size:

| 16 | 4.8 |
|---|---|
| 20 | 5.2 |
| 30 | 6.4 |
| 40 | 7.6 |
| 60 | 12.6 |
| 80 | 7.6 |
| 100 | 4.8 |
| 140 | 11.2 |
| 200 | 9.6 |
| 270 | 9.2 |
| −270 | 21.0 |

By way of another example, I tabulate hereinbelow the results obtained in a series of experiments using vortex chambers of varying depths, data being shown both for air and for steam. The material treated was Illinois coal of the tabulated screen analyses.

| Vortex Chamber Depth, inches | 4⁹⁄₁₆ | 4³⁄₁₆ | 4¹⁄₁₆ | 4¹⁄₁₆ | 4¹⁄₁₆ | 5⁵⁄₁₆ | 2⁹⁄₁₆ | 2 | 1½ | 2¼ |
|---|---|---|---|---|---|---|---|---|---|---|
| Upstream Steam Pressure, (p. s. i. g.) | 72 | 74 | 73 | 72 | 72 | 72 | 71 | 72 | 71 | 72 |
| Downstream Steam Pressure, (p. s. i. g.) | 5.5 | 8 | 6 | 6 | 6 | 6 | 4.3 | 3 | 3.5 | 3 |
| Hopper Temperature, °F | 485 | 485 | 485 | 495 | 490 | 500 | 530 | 520 | 510 | 550 |
| Steam Temperature, °F | 405 | 420 | 403 | 428 | 428 | 400 | 428 | 428 | 428 | 425 |

| U. S. S. Screen Analysis | Average Feed | Product, Weight Percent Retained on Screens | | | | | | | | |
|---|---|---|---|---|---|---|---|---|---|---|
| 30 | 44.5 | 6.1 | 5.1 | 6.2 | 4.0 | 4.0 | 5.2 | 6.0 | 6.1 | 6.4 | 5.2 |
| 60 | 25.5 | 17.2 | 15.6 | 16.0 | 14.0 | 14.2 | 17.6 | 17.3 | 13.4 | 13.3 | 15.3 |
| 100 | 10 | 16.3 | 16.8 | 15.1 | 15.1 | 16.1 | 16.1 | 14.9 | 13.4 | 13.1 | 14.9 |
| 200 | 10 | 18.6 | 18.9 | 23.9 | 21.0 | 20.3 | 20.0 | 18.4 | 18.0 | 24.4 | 20.0 |
| −200 | 9 | 40.3 | 45.0 | 38.3 | 45.9 | 44.6 | 40.7 | 41.8 | 48.4 | 42.1 | 45.3 |

| Vortex Chamber Depth, inches | 3 | 3 |
|---|---|---|
| Upstream Air Pressure, pounds per square inch gauge | 82 | 81 |
| Downstream Air Pressure, pounds per square inch gauge | 0.0 | 0.0 |
| Hopper Temperature, °F | 70 | 60 |
| Air Temperature | 450 | 380 |

| U. S. S. Screen Analysis | Average Feed | Product, Weight Percent Retained on Screens | |
|---|---|---|---|
| 30 | 15.0 | 1.0 | 2.0 |
| 60 | 17.5 | 5.3 | 7.4 |
| 100 | 17.0 | 10.4 | 10.0 |
| 200 | 19.5 | 16.4 | 16.4 |
| −200 | 30.0 | 67.0 | 63.5 |

By way of comparison, I tabulate hereinbelow the results obtained with the same flash pulverizing device without any vortex chamber.

Upstream steam pressure, p. s. i. g., 78
Downstream steam pressure, p. s. i. g., 1.1
Hopper temperature, °F., 375
Steam temperature, °F., 500

| U. S. S. Screen Analysis | Feed | Product |
|---|---|---|
| 30 | 45.8 | 15.9 |
| 60 | 25.3 | 22.2 |
| 100 | 7.3 | 14.3 |
| 200 | 9.5 | 19.8 |
| —200 | 11.4 | 26.7 |

Upstream air pressure, p. s. i. g., 80
Downstream air pressure, p. s. i. g., 1.5
Hopper temperature, °F., 70
Air temperature, 400

| U. S. S. Screen Analysis | Feed | Product |
|---|---|---|
| 30 | 45.0 | 18.0 |
| 60 | 24.5 | 23.0 |
| 100 | 8.5 | 15.6 |
| 200 | 9.7 | 20.1 |
| —200 | 11.6 | 22.8 |

Attention is directed to the much greater percentages of —200 mesh material obtained when using the vortex chamber.

Many details of procedure and construction may be varied without departing from the principles of this invention and without sacrificing the advantages disclosed hereinabove, and it is, therefore, not my purpose to limit the scope of the patent granted on this invention otherwise than necessitated by the appended claims.

I claim as my invention:

1. Apparatus for disintegrating a granular solid material permeable with respect to an expansible fluid comprising a closed receptacle for said solid material; a source of compressed expansible fluid; a first conduit connecting said receptacle with said source of fluid to permit permeation of said solid by said fluid; a second conduit extending substantially straight and having a substantially uniform cross sectional area except for a sharp constriction at one end thereof and connected at the other end to said source of compressible fluid for establishing a flow of fluid through said second conduit for discharge through that conduit end at which said constriction is located; an enclosed conveyor connecting said receptacle with said second conduit upstream of said constriction for introducing said solid material under balanced fluid pressure into said second conduit for forming ahead of said constriction a streaming entrainment in said fluid of said solid material; the shape and cross sectional area of said constriction being such as to permit free passage of said granules, said granules being shattered in passage through said constriction when said fluid is suddenly accelerated to critical velocity on passage through said constriction; and an axially confined vortex chamber of generally circular cross section arranged to receive generally tangentially the rapidly streaming entrainment of shattered particles discharged from said constriction, said vortex chamber being capable of having said entrainment vortically circulating therein for further comminution of shattered granules and being formed with a single axial central discharge aperture for discharging from said chamber a suspension in said fluid of shattered further comminuted particles.

2. Apparatus for disintegrating a granular solid material permeable with respect to an expansible fluid comprising a closed receptacle for said solid material; a source of compressed expansible fluid; a first conduit connecting said receptacle with said source of fluid to permit permeation of said solid by said fluid; a second conduit extending substantially straight and having a substantially uniform cross sectional area except for a sharp constriction at one end thereof and connected at the other end to said source of compressible fluid for establishing a flow of fluid through said second conduit for discharge through that conduit end at which said constriction is located; an enclosed conveyor connecting said receptacle with said second conduit upstream of said constriction for introducing said solid material under balanced fluid pressure into said second conduit for forming ahead of said constriction a streaming entrainment in said fluid of said solid material; the shape and cross sectional area of said constriction being such as to permit free passage of said granules, said granules being shattered in passage through said constriction when said fluid is suddenly accelerated to initial velocity on passage through said constriction; and a separator arranged to receive said suspension discharged from said vortex chamber to separate solid and fluid material.

JOHN I. YELLOTT.

REFERENCES CITED

The following references are of record in the file of this patent:

UNITED STATES PATENTS

| Number | Name | Date |
|---|---|---|
| 256,072 | Taggart | Apr. 4, 1882 |
| 1,578,609 | Mason | Mar. 30, 1926 |
| 1,655,618 | Mason | Jan. 10, 1928 |
| 1,922,313 | Mason | Aug. 15, 1933 |
| 1,950,558 | Karrick | Mar. 13, 1934 |
| 2,032,827 | Andrews | Mar. 3, 1936 |
| 2,139,808 | Dean | Dec. 13, 1938 |
| 2,175,457 | Dunn | Oct. 10, 1939 |
| 2,363,351 | Burmeister et al. | Nov. 7, 1944 |
| 2,385,508 | Hammond | Sept. 25, 1945 |
| 2,392,866 | Stephanoff | Jan. 15, 1946 |

OTHER REFERENCES

Bur. of Mines R. I. 3306 (1934).